A. GOODYEAR, 2d.

Grain-Binder.

No. 8,318. Reissued July 2, 1878.

*WITNESSES:*

C. Clarence Poole

J. S. Post

*INVENTOR:*

Albert Goodyear

By his attys

R. D. O. Smith

A. GOODYEAR, 2d.
Grain-Binder.

No. 8,318. Reissued July 2, 1878.

WITNESSES:
C. Clarence Poole
J. S. Post

INVENTOR:
Albert Goodyear
By his atty
R. D. O. Smith

A. GOODYEAR, 2d.
Grain-Binder.

No. 8,318. Reissued July 2, 1878.

WITNESSES:

C. Clarence Poole
J. S. Post.

INVENTOR:

Albert Goodyear
by his atty
R. D. O. Funk.

A. GOODYEAR, 2d.
Grain-Binder.

No. 8,318. Reissued July 2, 1878.

WITNESSES:
C. Clarence Poole
J. S. Post

INVENTOR:
Albert Goodyear 2d
By his atty
R. D. Spindt

A. GOODYEAR, 2d.
Grain-Binder.

No. 8,318. Reissued July 2, 1878.

WITNESSES:
C. Clarence Poole
J. S. Poole

INVENTOR.
Albert Goodyear.
By his atty
R. D. Smith

UNITED STATES PATENT OFFICE.

ALBERT GOODYEAR, 2D, OF HAMDEN, CONNECTICUT.

IMPROVEMENT IN GRAIN-BINDERS.

Specification forming part of Letters Patent No. 50,814, dated November 7, 1865; Reissue No. 8,318, dated July 2, 1878; application filed April 8, 1878.

*To all whom it may concern:*

Be it known that I, ALBERT GOODYEAR, 2d, of Hamden, in the county of New Haven and State of Connecticut, have invented a new and useful Improvement in Machines for Binding Grain; and I do hereby declare the following to be a full, clear, and exact description of the same, when taken in connection with the accompanying drawings and the letters of reference marked thereon, and which said drawings constitute part of this specification, and represent, in—

Figure 1:
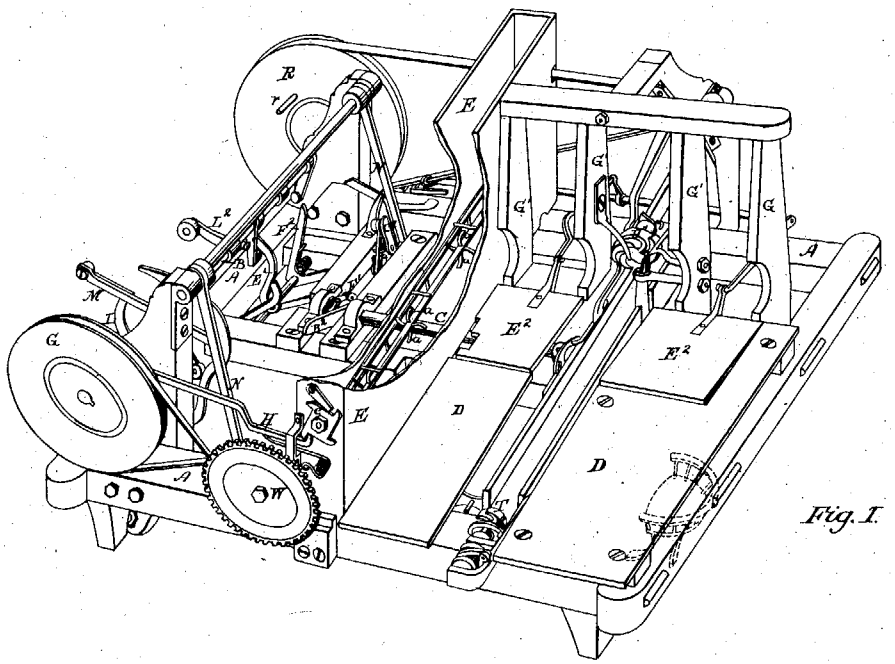
Figure 2:
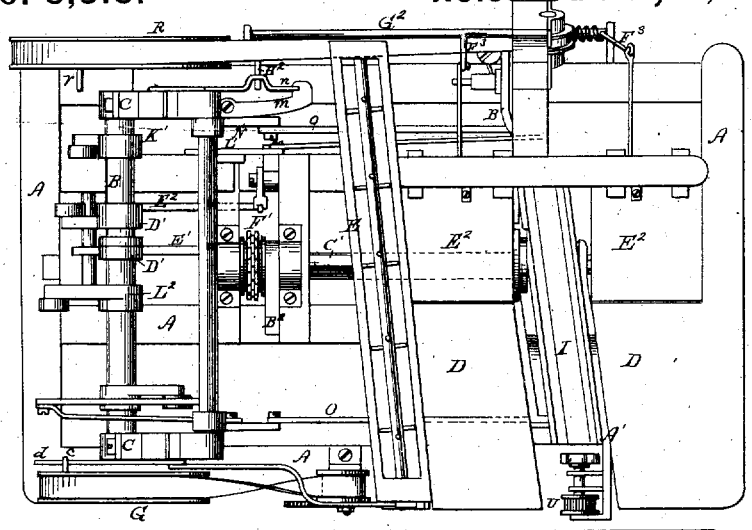
Figure 3:
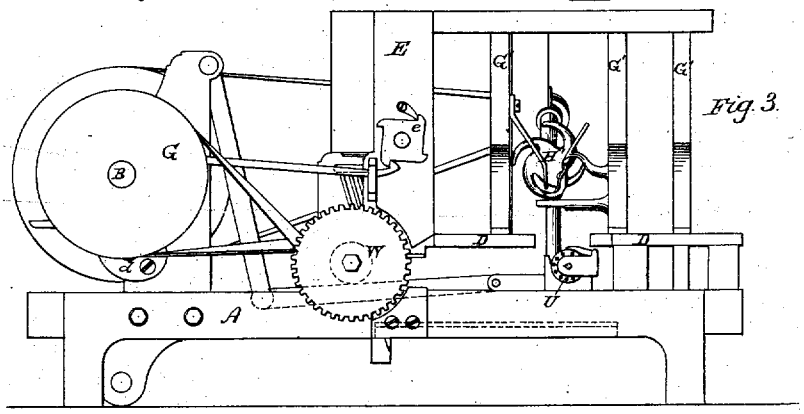
Figure 4:
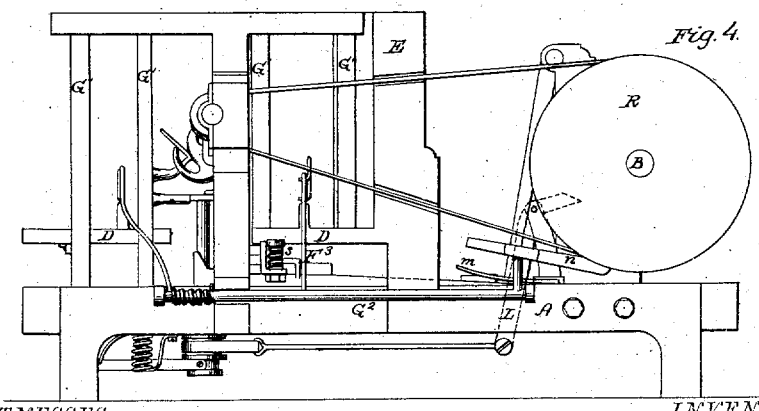
Figure 5:
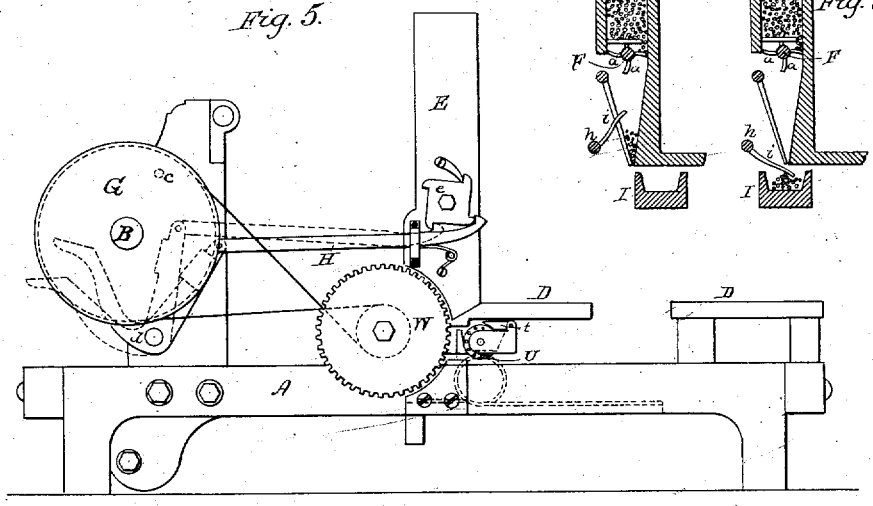
Figure 12:
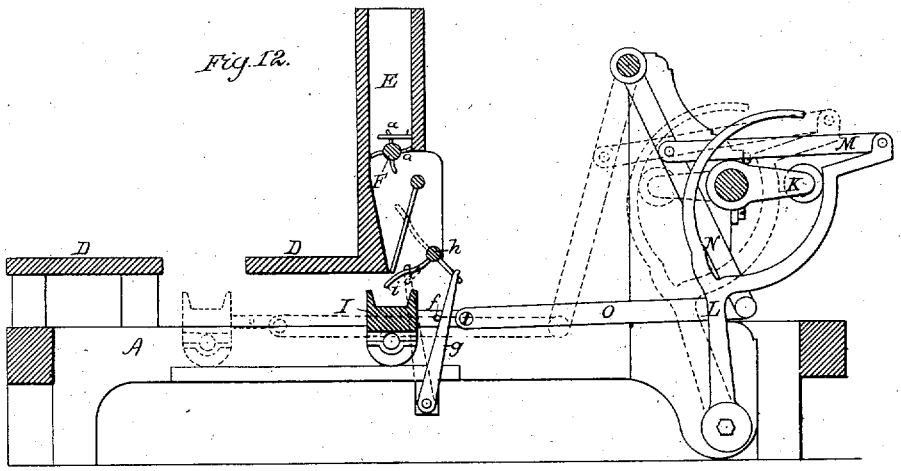
Figure 13:
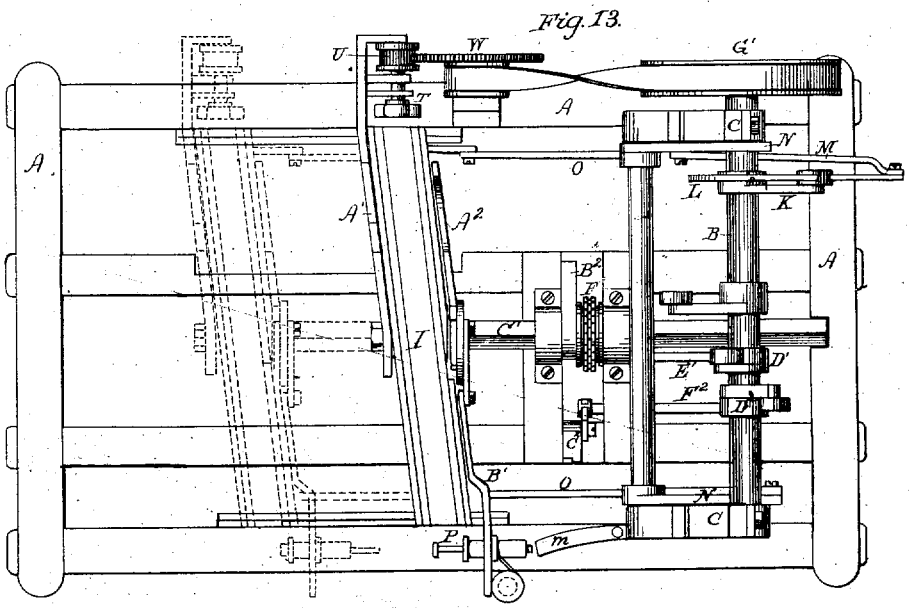
Figure 14:
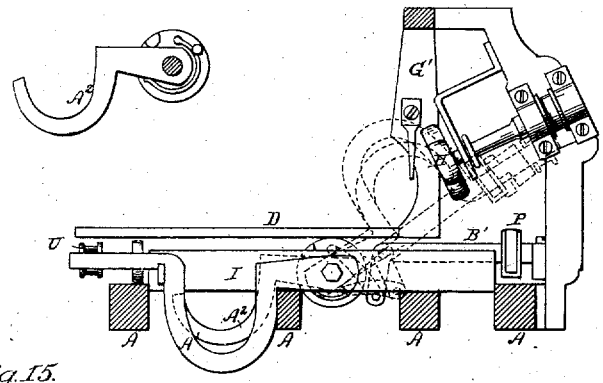
Figure 15:
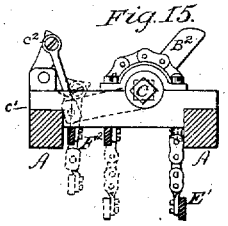
Figure 16:
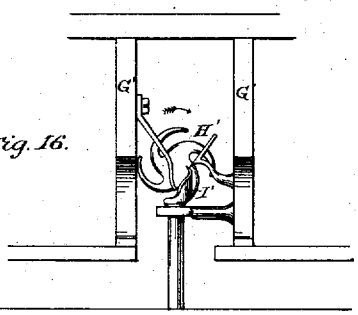
Figure 16:
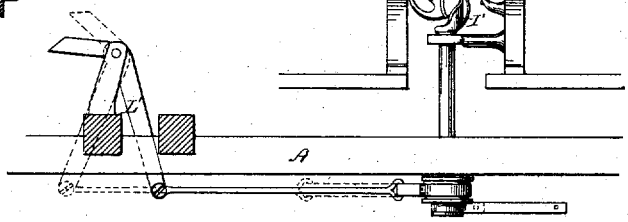
Figure 17:
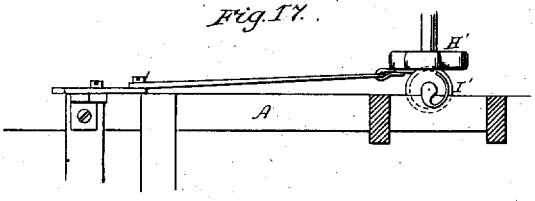
Figure 18:
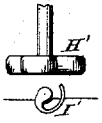

Figure 1, a perspective view; Fig. 2, a plan or top view; Fig. 3, a front side view; Fig. 4, a back side view; Figs. 5, 6, 7, 8, 9, 10, and 11, detached views to illustrate the forming of the band; Fig. 12, a sectional view, and Fig. 13 a plan view, illustrating the transference of the band from the place of formation to place of use; Figs. 14 and 15, gathering the grain into a bundle preparatory to binding; Figs. 16, 17, and 18, securing the band around the bundle; and in Fig. 19, discharging the bound bundle from the machine.

Similar letters indicate corresponding parts.

My invention relates to improvements in machinery for bundling and binding grain.

The first part of my invention consists in a supply-box provided with a turning feed apparatus adapted to intermittently discharge the bands therefrom, substantially as described.

The second part of my invention consists in a receptacle for the bands, with a narrow throat in the exit-passage from the supply-box, and a reciprocating pallet, arranged so that the pallet in its reciprocations shall statedly and intermittently force the bands through said throat, as and for the purpose set forth.

The third part of my invention consists in a band-tray, into which the bands are laid longitudinally, and which is provided at one end with a clamping mechanism, adapted to seize and hold one end of said band, and at the other end with a rotating twisting mechanism, adapted to twist the band so held.

The fourth part of my invention consists in a band-twisting or band-preparing mechanism, consisting, essentially, of two or more hooks, adapted, when rotated, to seize and twist together the several parts or strands of the band, as set forth.

The fifth part of my invention consists in a reciprocating band-tray, upon which is mounted, as upon a carriage or an ordinary carrier, a set of arms, bearing at either end of the tray a band-holder, and that also unite in themselves the functions of band-carriers and grain-gatherers.

The sixth part of my invention consists in a band-carrier mounted upon a reciprocating carriage, and arranged so that by the reciprocation of the carriage the band may be taken by the carriers from a receptacle of the bands at one side of the binding-platform, and carried by them underneath the binding-table, and to a central position underneath the grain to be bound, substantially as set forth.

The seventh part of my invention consists in a pair of reciprocating band-carrying arms, arranged in connection with a band-twisting mechanism, so that by the reciprocation of the carriers the two ends of the band shall be presented on opposite sides of the band-twisting mechanism, substantially as and for the purpose set forth.

The eighth part of my invention consists, essentially, of a revolving shaft or head, having thereon or springing therefrom one or more curved fingers or hooks, adapted to gather and to carry toward its axis, without liability of entanglement with loose grain, the band to be twisted.

The ninth part of my invention consists of a band-twisting device, essentially composed of a rotating toothed wheel, the teeth whereof are elongated and hooked, so that as they rotate they will gather toward the center any object which comes within their points.

The tenth part of my invention consists in a rotating twister, composed of two or more hooks, radiating in opposite directions from the same axis, that in their rotation seize the ends of the band on opposite sides of said axis, and rotate them around each other.

The eleventh part of my invention consists of a movable binding-table, adapted to allow the bound bundle to fall or be discharged by gravity.

To enable others skilled in the art to construct and use my machine, I will proceed to describe the same as illustrated in the accompanying drawings.

Figure 6:
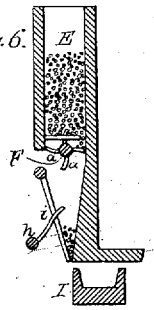
Figure 7:
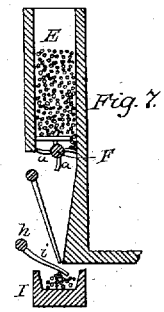
Figure 8:
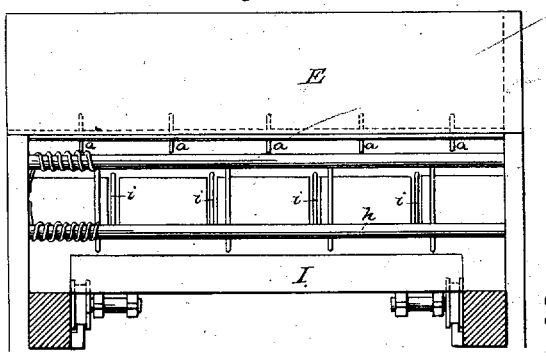
Figure 9:
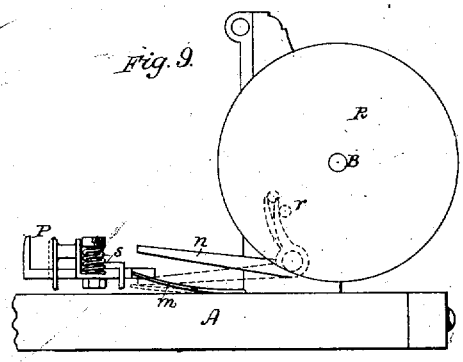
Figure 10:
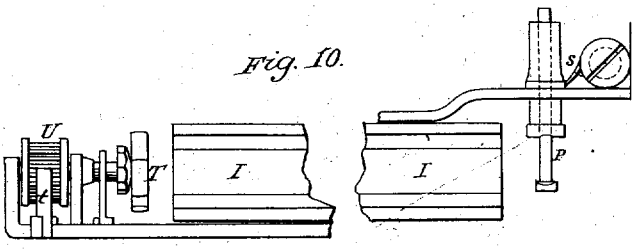
Figure 11:
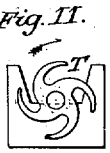

A is the frame or bed of the machine, which may be attached to or made a part of an ordinary reaping-machine. B is the driving-shaft, supported and made to revolve in proper bearings C. D is the platform, upon which the grain is placed, automatically from the reaper or otherwise, so as to be across the opening in the platform D. E is a box, which contains the straw from which the band is to made. (Shown in section in Figs. 6 and 7.) Through the said box E, I place a shaft, F, provided with fingers *a*, as seen in Figs. 6, 7, and 8. The shaft F is made to revolve by a pawl, H, operated by the stud *c* on the wheel G, (see Fig. 2,) acting through the lever *d*. Each revolution of the wheel G moves the said pawl H from the position in black to that denoted in dotted lines, Fig. 5. In this movement the pawl catches and turns the toothed wheel *e* which is fixed to the shaft F, one-fourth around, (more or less,) in which movement of the said shaft F a portion of the straw in the box E is caught by the fingers *a*, drawn down from the box, and dropped upon the rack below, as denoted in Fig. 6. I is the box in which the band is formed. It traverses from below the box E, where the band is formed, as seen in Figs. 12 and 13, to the open space in the platform, as seen in the said Figs. 12 and 13 in dotted lines. The said box I is moved by the crank K through the levers L, M, N, and O in their operation, moving from the position in black to that denoted in dotted lines. (See Fig. 12.) As the said box I returns from its position in dotted lines to that in black, (see Fig. 12,) a stud, *f*, strikes the lever *g*, moving in from the position in dotted lines to that denoted in black; and said lever *g*, acting upon the shaft *h*, turns the said shaft *h*, upon which are several fingers, *i*, (see Fig. 6,) to the position denoted in Fig. 7, thus carrying the straw from the rack (see Fig. 6) down into the box I, Fig. 7. Thus placed in the box, one end of the straw is grasped by the clasp P. (See Fig. 9.) The said clasp is attached to a lever, $B^1$. (See Figs. 13 and 14.) As the box I comes to the position denoted in Fig. 12, the said clasp P comes against the spring *m*, and is thereby opened to the position denoted in Fig. 9, and is released to close upon the straw by the lever *n* bearing down the said spring *m*, as denoted in dotted lines, Fig. 9. The said lever *n* is moved to operate thus by a stud, *r*, on the wheel R, the said clasp closing by the action of the springs. (See Fig. 10.) This secures one end of the straw preparatory to twisting the band.

At the opposite end of the box I (see Fig. 10) is placed a twister, T, (see Fig. 11,) which is made to revolve through the pinion V coming in contact with the toothed wheel W. (See Fig. 13.) Said toothed wheel W is made to revolve by a belt running from the wheel G. The twister T, (see Fig. 13,) revolving in the direction denoted by the arrow, gathers the straw with its several teeth or fingers, and twists the straw so long as it is made to revolve. When sufficiently twisted, a pawl, *t*, serves to prevent twister from reverse motion and the band from untwisting. Thus completed, the band is carried by the movement of the box I, before described, to the open space in the platform D. Connected with the said box I, and traveling with it, is placed the gatherer $A^1$, upon the outer end of which the twister T is fixed. Upon the opposite side of the box I is placed the lever $B^1$, to which the clasp P is fixed. The gatherer $A^1$ is fixed to a square shaft, $C^1$, (see Fig. 15,) which, by the action of the cam $D^1$, through a lever, $E^1$, and the chain-wheel $F^1$ upon the said shaft $C^1$, is caused to make a partial revolution, as denoted in dotted lines, Fig. 15, carrying with it the gatherer $A^1$ and twister T, which holds one end of the band to the position denoted in dotted lines, Fig. 14, by which movement of the gatherer the grain lying upon the platform is collected within the curved part of the said gatherer and pressed into a bundle against the posts $G^1$. A second lever or gatherer, $A^2$, is attached to the shaft $C^1$ upon the opposite side of the box I, (see Fig. 13,) to compress the gavel and relieve the band from strain. A lever, $B^2$, (see Figs. 2 and 15,) is secured to the shaft $C^1$, and is turned with the said shaft until it is passed over sufficiently to allow the lever $C^2$ (see Fig. 15) to be drawn down upon it, in order to add to the pressure applied to compress the bundle. The lever $C^2$ is operated by the cam $D^2$ through the lever $F^2$. (See Fig. 13.) By the same movement of the said shaft $C^1$ the lever $B^1$, with the clasp P holding the other end of the band, is carried up to the position denoted in dotted lines, Fig. 14. The diagonal position in which the box I is placed, and the relative position which the twister T and the clasp P thereby have to each other, is such that when the twister and clasp are carried to the position denoted in Fig. 14 the two ends of the band will be carried to opposite sides of a second twister, $H^1$. (Seen in Figs. 3 and 16.) This twister consists, essentially, of a revolving shaft or head, having thereon, or springing therefrom, curved fingers or hooks, more or less in number, as desired, adapted to gather and to carry toward its axis, without liability of entanglement with loose grain, the band to be twisted.

I am aware that a twister has been constructed with wide leaves oblique to the periphery of a cone, and extending from the base to the point thereof, and therefore do not claim, broadly, a twister having radially-projecting portions to engage the ends of the band and carry them around each other. The twister referred to in this paragraph could only operate successfully when the band ends were so presented as to fall between the leaves throughout their length, because if they fell transversely upon said leaves they were both liable to be broken, and liable to slip off and produce an unsafe knot. In this specification, therefore, I am to be understood as referring always to a twister having radial fingers or hooks in contradistinction to radial leaves, as above described. The fingers are not liable in any measure to the defects spoken of.

The said twister $H^1$ is caused to revolve by a band from the wheel R, as seen in Figs. 2 and 4. The fingers of the twister $H^1$, revolving in the direction denoted by the arrow, will catch the two ends of the band, drawing them from the twister T and clasp P, will twist them together, and when sufficiently twisted the hand I′ (see Figs. 16, 17, and 18) will, by the action of the cam K′, through the lever $L^1$, be turned from the position denoted in Fig. 17 to that shown in Fig. 18, and tuck the twisted ends under the band in similar manner as would be done by hand.

When the grain is thus bound the compressor A and the gatherer $A^1$, with the twister T and clasp P, return to the position denoted in black, Fig. 14, by the action of the cam $L^2$. Thence the box I, with the gatherer, &c., attached, is returned to the first position, as before described, to receive and twist a second band, while the bundle thus bound is left upon the traps $E^2$, Fig. 19, which are hinged to the frame at $a^2$, and are supported in the position denoted in black by levers $F^3$, (see Fig. 4,) attached to a shaft, $G^2$, upon which a spring supports the traps $E^2$.

Figure 19:
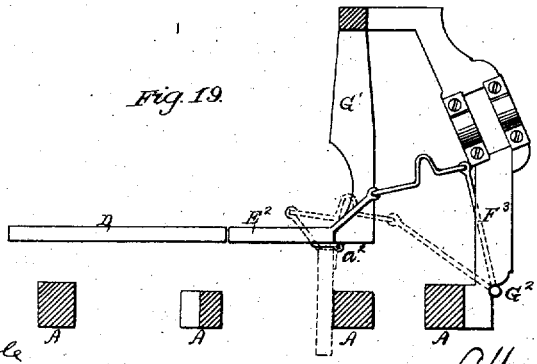

As the lever $n$ descends to release the clasp P, as before described, it (the lever $n$) strikes the lever $H^2$ on the said shaft $G^2$, (see Fig. 2,) and turns the said shaft, with its levers $F^3$, and with them the traps $E^2$, to the position denoted in dotted lines, Fig. 19, which movement of the traps $E^2$ permits the bundle of grain to fall through the platform to the ground beneath. This done, the release of the lever $n$ from the action of the stud $r$ (see Fig. 9) permits the traps, by the action of the spring on the shaft $G^2$, to return to the position in black, Fig. 19.

A sufficient quantity of grain for a second bundle having been placed upon the platform D, as before described, it will, by the continuous action of the machine, be gathered up, bundled, bound, and dropped in like manner as the first described, and so continue so long as the machine is in motion and grain supplied thereto.

I have described the band as clasped firmly at one end, while the twister T twists at the other end; but a twister may be used at both ends.

My machine may be attached to an ordinary reaper and receive its power therefrom; or it may be used independently of a reaper, power being applied in any convenient or known manner, which will readily suggest itself to those skilled in the use of machinery.

Many of the parts of my machine may be changed to improve or modify the mechanical workings thereof without changing the general principle herein described.

I have described my machine as automatically receiving the straw which is to form the band, instead of which the straw may be placed in the box I by hand.

For the comfort or convenience of the operator, a seat may be applied to the platform, as denoted in dotted lines, Fig. 1.

I do not broadly claim an automatic hand, operating for the purpose of tucking under the twisted ends of the band.

Having therefore fully described my invention, what I claim as new and useful is—

1. A supply box or receptacle for bands, combined with a turning-feed apparatus which intermittently discharges the bands, substantially as set forth.

2. A supply box or receptacle for bands and a feed apparatus which intermittently discharges the bands, combined with a narrow throat wherein the band is received and retained until wanted; and a reciprocating pallet, which statedly forces said band through said throat and finally discharges it.

3. A tray wherein the bands are deposited, combined with devices located in said tray for clamping and twisting the band, substantially as set forth.

4. A tray wherein the bands are deposited, combined with a holding device for one end of the band, and a rotating twisting device at the other end to seize and twist the band.

5. A tray, E, wherein the bands are deposited, combined with one or more twisters, T, to seize and twist the band, substantially as set forth.

6. A tray wherein the bands are deposited, provided with band-feed apparatus, and combined with two pivoted arms, each of which bears at its outer end a band-holder, whereby the band is removed from said tray and carried around the bundle, and its ends delivered to the band-securing mechanism.

7. A band-carrier mounted upon a reciprocating carriage, whereby it receives the band from a receptacle at one side of the binding-platform, and carries it beneath the binding-table, to deliver it around the center of a sheaf, as set forth.

8. A band-receiving tray mounted upon a reciprocating carriage, whereby the band is received at one side of the binding-platform and conveyed beneath the binding-table, combined with two pivoted arms, whereby the ends of the band are carried around the bundle and delivered to the band-securing mechanism.

9. A band-twisting device composed, essentially, of a rotating shaft having one or more hook points or fingers, which engage with and twist together the ends of the band.

10. A band-twisting device, which consists, essentially, of a rotating toothed shaft or wheel, the teeth whereof are elongated and hooked in the plane of rotation, so that as they rotate they will gather toward the center any object which comes within their points.

11. A reciprocating band-carrier, which receives the band at one side of the binding-platform, and carries it laterally to a point opposite the center of the sheaf and places it around the sheaf, combined with a rotating band-twisting device, which seizes and twists together the ends of the band, as set forth.

12. A revolving band-twisting device consisting of a revolving head with spirally-radial hooks or fingers with rounded surfaces, whereby the parts of the band are seized and twisted together.

13. A movable binding-table adapted to support the bundle while being bound, and then to permit the same to be discharged by gravity, combined with a band-carrying mechanism having a lateral movement below said table, which alternately advances to bring the band to the bundle, and retreats when the binding has been completed.

14. A binding-table movable upon points or hinges, and maintained in position by an elastic support, combined with automatic mechanism whereby said support is overcome at stated times, and said table permitted to swing downward and discharge the bundle by gravity.

15. The reciprocating band-carrier I, traveling upon a guideway, combined with the tappet-lever L and connecting parts M N O, and the operative crank K, as set forth.

16. The band-tray I, provided with the band-twister T and pinion U, combined with the gear-wheel W, whereby said twister is rotated at the proper time.

17. The combination, in an automatic binder, of a binding-table and a reciprocating grain-gathering arm or compressor, the combination operating to allow the grain to be bundled by the reciprocations of the gatherer or compressor, and the bundle to be discharged by gravity.

ALBERT GOODYEAR, 2D.

Witnesses:

R. D. O. SMITH,

I. S. POST.